March 15, 1955     J. H. STRICKLIN     2,703,990
AUTOMATIC BRAKE RELEASING MECHANISM
Filed Feb. 26, 1954     2 Sheets-Sheet 1
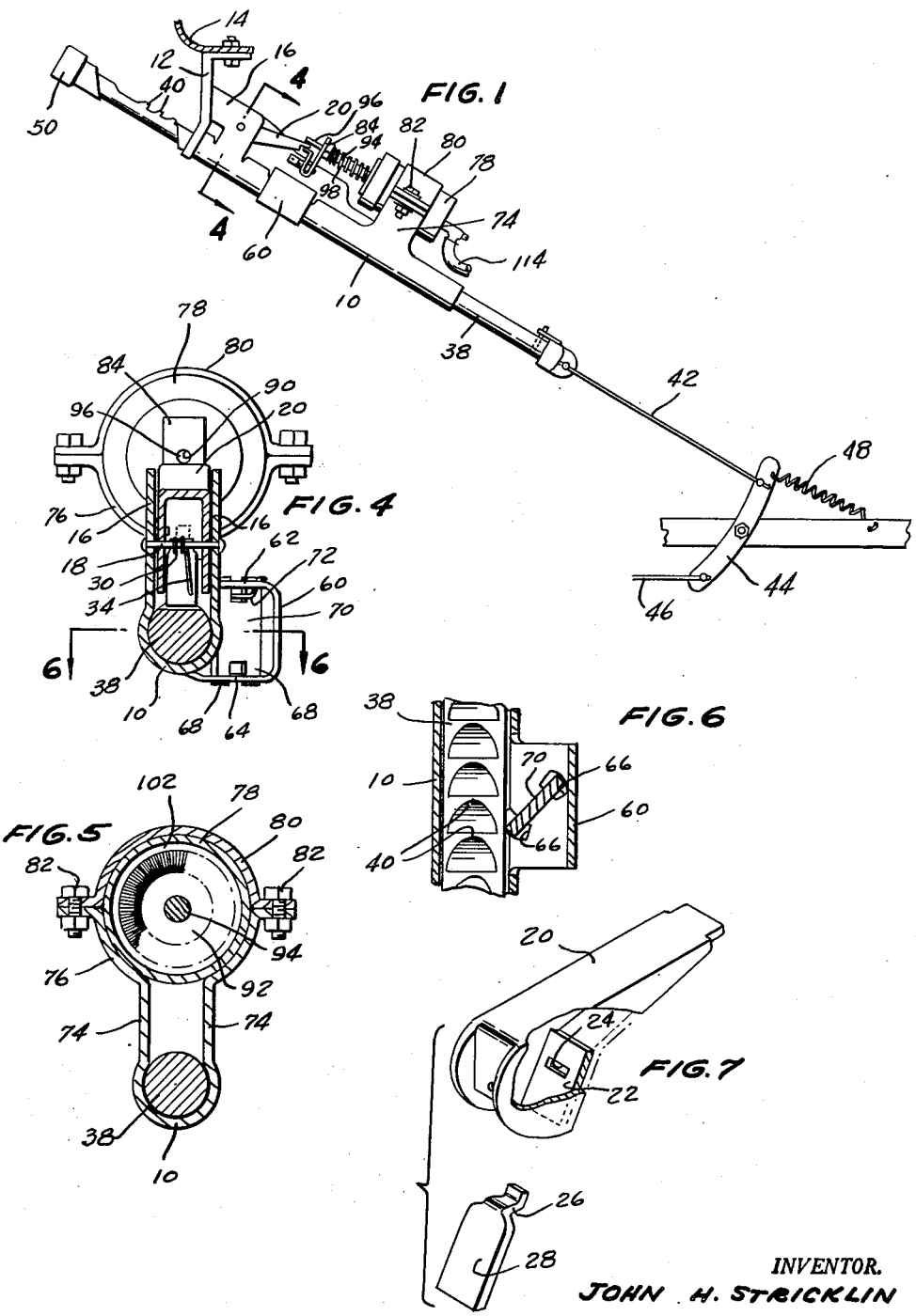
INVENTOR.
JOHN H. STRICKLIN
BY
McMorrow, Berman + Davidson
ATTORNEYS March 15, 1955   J. H. STRICKLIN   2,703,990
AUTOMATIC BRAKE RELEASING MECHANISM
Filed Feb. 26, 1954   2 Sheets-Sheet 2
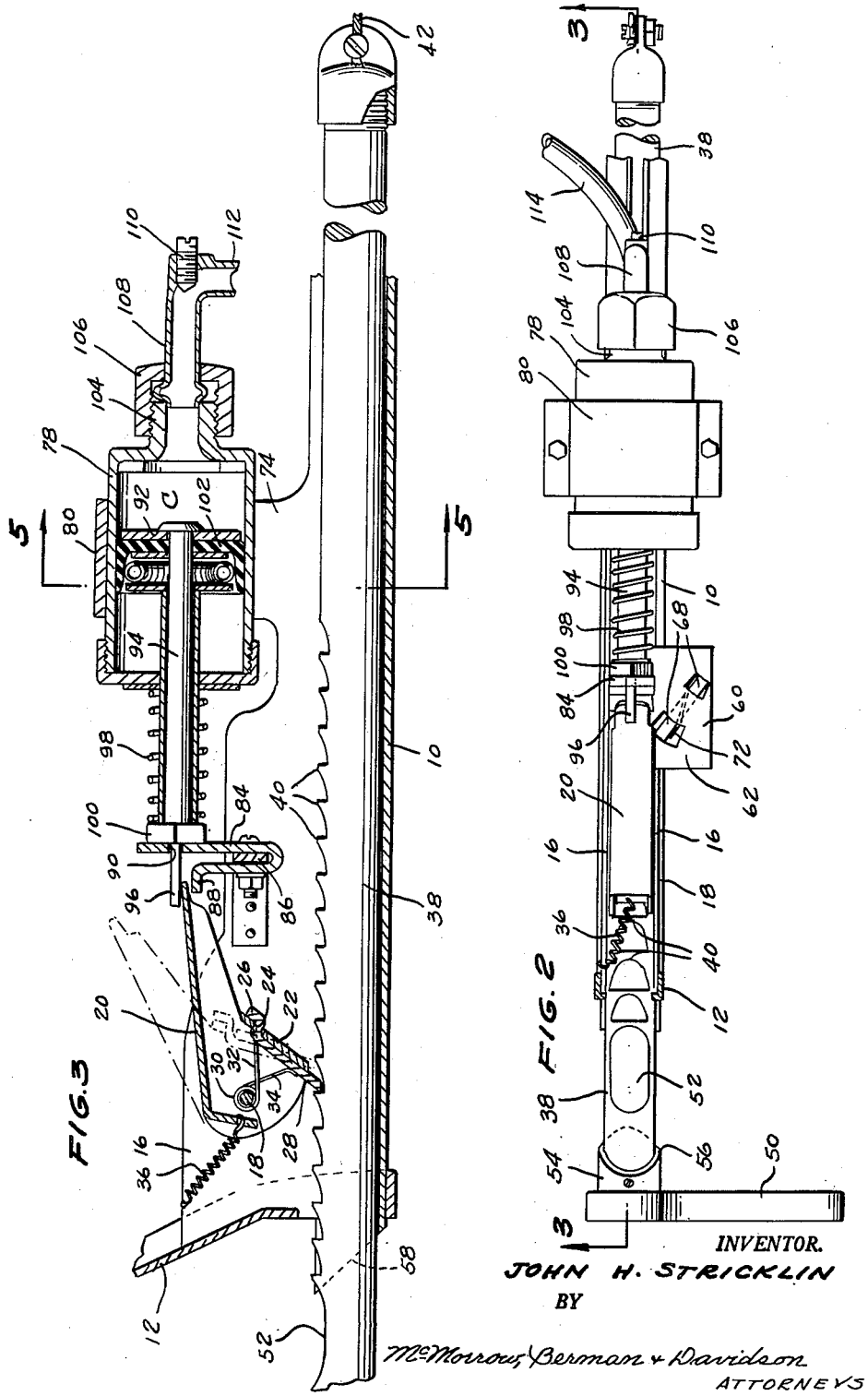
INVENTOR.
JOHN H. STRICKLIN
BY
McMorrow, Berman & Davidson
ATTORNEYS

# United States Patent Office 2,703,990
Patented Mar. 15, 1955

2,703,990

AUTOMATIC BRAKE RELEASING MECHANISM

John H. Stricklin, Lutts, Tenn.

Application February 26, 1954, Serial No. 412,920

6 Claims. (Cl. 74—503)

This invention relates to an automatic brake releasing mechanism and has for its primary object to prevent the driving of a vehicle with its parking brake set.

Another object is to avoid wear on the brake lining of the parking brake and also to eliminate the dangers accompanying the heating of the brake because of the operation of the vehicle with the brake set.

The above and other objects may be attained by employing this invention which embodies among its features a latch dog mounted adjacent the conventional toothed plunger by which the parking or emergency brake of a vehicle is set for engaging a tooth of said plunger and holding the brake set, a bolt mounted adjacent the latch dog for operatively engaging and holding said latch dog in the path of movement of the toothed plunger, and means carried by the bolt and operatively connected to the manifold of the engine of the vehicle on which the brake is employed for retracting said bolt and freeing the latch dog to move out of the path of movement of the toothed plunger to allow the plunger to move to release the brake.

Other features include a rock arm mounted adjacent the toothed plunger to rock in a vertical arcuate path above the toothed side thereof, a latch dog carried by the rock arm for movement therewith in a path which intersects the path of movement of the plunger, spring means carried adjacent the plunger and operatively connected with the rock arm for yieldingly moving the rock arm in a direction to advance the latch dog into engagement with the toothed plunger, a bolt mounted adjacent the plunger and intersecting the arcuate path to engage the rock arm and hold the latch dog in engagement with a tooth on the plunger, and vacuum actuated means carried by the bolt and operatively connected to the manifold for moving the bolt out of the arcuate path upon the starting of the engine to thus free the rock arm to move under the influence of retraction of the toothed plunger and extract the latch dog out of engagement with the tooth on the plunger.

In the drawings:

Figure 1 is a side view of this improved brake releasing mechanism embodying the features of this invention showing it connected to a lever for setting the parking brake of the vehicle on which the device is employed;

Figure 2 is a fragmentary top plan view of the device illustrated in Figure 1, shown on a somewhat enlarged scale;

Figure 3 is a longitudinal sectional view taken substantially on the line 3—3 of Figure 2;

Figure 4 is a transverse sectional view taken substantially on the line 4—4 of Figure 1, shown on a somewhat enlarged scale;

Figure 5 is a vertical sectional view taken substantially on the line 5—5 of Figure 3;

Figure 6 is a fragmentary sectional view taken substantially on the line 6—6 of Figure 4; and Figure 7 is an exploded perspective view of the rock arm and latch dog.

Referring to the drawings in detail, a trough-shaped guide 10 is supported by a bracket 12 on a convenient element 14, such as the underside of the instrument board of the vehicle and carries adjacent the bracket 12 upwardly extending spaced parallel supports 16 through which extends a pivot pin 18 which lies above the axis of the guide 10 in perpendicular relation thereto. Mounted on the pivot pin 18 for rocking movement in a vertical arcuate path above the bottom of the guide 10 is a rock arm 20 carrying a downwardly extending inclined plate 22 having an opening 24 extending therethrough for the reception of the bent tongue 26 of a latch dog 28 by means of which the latch dog is rockably supported adjacent the inclined plate 22. Encircling the pivot pin 18 is a torsion spring 30, one leg 31 of which bears on the plate 22 while the other leg 34 bears on the latch dog 28. A retractile coiled spring 36 is connected at one end to the rock arm 20 and at its opposite end to one of the side walls 16 to yieldingly advance the rock arm 20 about the pivot 18 toward the guide 10 and the latch dog 28 into the path of movement of a toothed brake setting plunger, to be more fully hereinafter described.

The toothed brake setting plunger above referred to is designated by the numeral 38 and carries on one side longitudinally spaced teeth 40 which are adapted to be engaged by the latch dog, as illustrated in Figure 3, to hold the plunger 38 against longitudinal movement in the guide 10 in a direction to release the parking brake of the vehicle. The plunger 38 is connected through the medium of a cable 42 with a parking brake setting lever 44 which in turn is connected through the medium of a conventional cable 46 to the parking brake (not shown). A retractile coil spring 48 is connected at one end to the vehicle and at its opposite end to the lever 44 in order to exert pull on the cable 42 and plunger 38 in a direction to release the brake. Carried by the plunger 38 and extending laterally therefrom adjacent the end thereof remote from the cable 42 is a handle 50 for manual operation of the plunger 38 in setting the brake. Formed in the side of the plunger having the teeth 40 adjacent the handle 50 is a recess 52, the purpose of which will hereinafter appear. Carried by the handle 50 and in encircling relation to the plunger is a sleeve 54 having a beveled end 56 which is adapted to cooperate with the beveled end 58 of the guide 10 in causing the handle 50 to project horizontally outwardly from the guide 10 when the plunger 38 is moved for its full length of travel in the direction to release the brake.

Carried by the guide 10 and extending laterally outwardly therefrom is a housing 60 having horizontally extending spaced parallel top and bottom walls 62 and 64, respectively, which are provided with diagonally spaced aligning openings 66 for the reception of the legs 68 of a latch member 70 which is biased toward and into contact with the toothed plunger 38 under the influence of a spring 72 carried by the housing 60 and having a leg which bears against the member 70 to urge it into yielding contact with the plunger 38. The latch member 70 is so disposed that when the handle 50 is rotated about the longitudinal axis of the plunger 38, the plunger will be rotated to move the teeth 40 into the path of movement of the member 70 in order to enable the brake to be set even while the engine of the vehicle is in operation. It will thus be seen that the brake may be retained in set position without employing the latch dog 28, previously described.

Carried by the guide 10 and extending upwardly therefrom in spaced parallel relation remote from the side walls 16 are supports 74 which extend outwardly and upwardly from their upper ends to define a cradle 76 in which is seated a cylinder 78. A strap 80 extends across the top of the cylinder 78 and is bolted as at 82 to the seat 76 in order to clamp the cylinder 78 in proper position with relation to the plunger 38.

A guide 84 is mounted on a cross bar 86 carried by the upwardly extending walls 16 and extending therebetween in spaced relation to the supports 74 and carried by the guide 84 and extending outwardly therefrom in a direction toward the rock arm 20 is a stop 88 which, as illustrated in Figures 1 and 3, intersects the path of movement of the rock arm 20 and engages said rock arm to limit the movement thereof toward the plunger 38 under the influence of the spring 36. Formed in the guide 84 and extending therethrough in axial alignment with the cylinder 78 is a guide opening 90.

Mounted for longitudinal sliding movement in the cylinder 78 is a piston 92 carrying a piston rod 94 which extends through the end of the cylinder adjacent the guide 84 and carried by the piston rod 94 and extending longitudinally therefrom through the opening 90 is a bolt 96 which, as illustrated in the drawings, is yieldingly urged away from the cylinder 78 under the influence of a compression coil spring 98 which bears at one end on the cylinder 78 and at its other end against a stop nut 100 carried by the plunger 94. A piston is equipped with a suitable packing 102 which will form a fluid-tight connection with the inner wall of the cylinder 78. Carried by and extending outwardly from the end of the cylinder 78 remote from the guide 84 is an externally screw-threaded nipple 104 which communicates with the interior of the cylinder and has coupled thereto by a conventional coupling 106 a fitting 108 which is equipped with a needle valve 110 and coupling means 112 to which is connected a hose 114 which in turn is connected to the intake manifold of the engine of the vehicle on which the device is employed so that when the engine is started and vacuum is created in the manifold which because of the reduced pressure produced within the chamber C within the cylinder 78 will cause the piston 92 to move against the effort of the spring 98 and withdraw the bolt 96 from its projected position above the stop 88.

In use, it will be evident that the spring 36 will advance the rock arm 20 toward the plunger 38 until such time as the rock arm engages the stop 88 in which position the latch 28 will extend into the path of movement of the teeth 40 on the plunger 38. In setting the brake, the plunger 38 is moved in the direction of the arrow in Figure 3 until the selected degree of tightness of the brake has been achieved. In this position, the engagement of the latch dog 28 with a tooth 40 will retain the brake set until such time as the engine is started. Upon the starting of the engine, a vacuum will be created in the chamber C of the cylinder 78 to move the piston 92, piston rod 94 and bolt 96 longitudinally so as to extract the bolt 96 from its position above the stop lug 88 and free the rock arm 20 to move about the pivot pin 18 under the influence of the spring 48 which moves the lever 44 in a direction to release the brake. Obviously, the upward movement of the rock arm 20 will move the latch dog 28 out of the path of movement of the teeth 40 and owing to the relatively light tension of the spring 36, the latch dog 28 will ratchet over the teeth 40 until the plunger is moved into the position in which the recess 52 lies beneath the latch dog at which time the spring 36 will rock the rock arm 20 into engagement with the stop 88 and move the latch dog 28 into the path of movement of the teeth 40. With the parts in the position thus described, the parking brake of the vehicle will be automatically released by the vacuum created in the manifold of the engine. Simultaneously with the movement of the plunger 38 longitudinally toward the lever 44, the beveled ends 56 and 58 of the handle sleeve 54 and the guide 10 will cause the handle to assume a horizontal position in which it is retained until such time as the brake is again set. In instances where it is desirable to set the brake with the engine running, the handle 50 is turned to a vertical position, thus rotating the plunger 38 one-quarter of a turn so that upon exerting pull on the plunger 38 the teeth 40 will be engaged by the latch member 70 which is moved into the path of movement of the teeth 40 by the spring 72. By so employing the latch member 70, the brake may be set and retained in a set condition with the engine running. Obviously, when the brake is released and the plunger 38 moves under the influence of the spring 48, the cam faces defined by the beveled end 50 of the sleeve 54 and the beveled end 58 of the guide 10, the plunger 38 will be automatically rotated about its longitudinal axis to bring the teeth 40 in a position to be engaged by the latch dog 28. By using this device, it is obvious that the operator of a motor vehicle will be saved the necessity of remembering to release the parking brake when starting the engine.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a self-propelled vehicle of the type which includes an engine having an intake manifold, a parking brake held in released condition under yielding effort, a toothed plunger mounted on the vehicle for longitudinal movement and operatively connected to the parking brake for moving it against the yielding effort to apply said brake, and a handle carried by the plunger and extending outwardly therefrom for moving the plunger against the yielding effort and applying the brake, means for locking said toothed plunger in brake applying position and for automatic release upon the starting of the engine, said means including a latch dog mounted adjacent the toothed plunger for movement into and out of the path of movement of the toothed plunger and into and out of engagement with a tooth on said toothed plunger, a bolt mounted adjacent the latch dog for movement parallel to the plunger and operatively engaging and holding said latch dog in the path of movement of the toothed plunger, and means carried by the bolt and operatively connected to the manifold for retracting said bolt and freeing the latch dog to move out of the path of movement of the toothed plunger to allow the plunger to move under the yielding pressure and release the brake.

2. In a self-propelled vehicle of the type which includes an engine having an intake manifold, a parking brake held in released condition under yielding effort, a toothed plunger mounted on the vehicle for longitudinal movement and operatively connected to the parking brake for moving it against the yielding effort to apply said brake, and a handle carried by the plunger and extending outwardly therefrom for moving the plunger against the yielding effort and applying the brake, means for locking said toothed plunger in brake applying position and for automatic release upon the starting of the engine, said means including a rock arm mounted adjacent the toothed plunger to rock in a vertical arcuate path above the toothed side of said plunger, a latch dog carried by the rock arm for movement therewith in a path which intersects the path of movement of the plunger, spring means carried adjacent the plunger and operatively connected with the rock arm for yieldingly moving the rock arm in a direction to advance the latch dog into engagement with the toothed plunger, a bolt mounted adjacent the plunger and intersecting the arcuate path to engage the rock arm and hold the latch dog in engagement with a tooth on the plunger, and vacuum actuated means carried by the bolt and operatively connected to the manifold for moving the bolt out of the arcuate path upon the starting of the engine.

3. In a self-propelled vehicle of the type which includes an engine having an intake manifold, a parking brake held in released condition under yielding effort, a toothed plunger mounted on the vehicle for longitudinal movement and operatively connected to the parking brake for moving it against the yielding effort to apply said brake, and a handle carried by the plunger and extending outwardly therefrom for moving the plunger against the yielding effort and applying the brake, means for locking said toothed plunger in brake applying position and for automatic release upon the starting of the engine, said means including a rock arm mounted adjacent the toothed plunger to rock in a vertical arcuate path above the toothed side of said plunger, a latch dog carried by the rock arm for movement therewith in a path which intersects the path of movement of the plunger, spring means carried adjacent the plunger and operatively connected with the rock arm for yieldingly moving the rock arm in a direction to advance the latch dog into engagement with the toothed plunger, a bolt mounted adjacent the plunger to move in a path which intersects the arcuate path, yielding means mounted adjacent the plunger and operatively engaging the bolt for projecting said bolt into the arcuate path and engagement with the rock arm to hold said arm against movement and the latch dog in engagement with a tooth on the toothed plunger, and vacuum actuated means carried by the bolt and operatively connected to the manifold for moving the bolt against the effort of the yielding means and retracting it out of the arcuate path to free the rock arm and allow it to move in a direction to retract the latch dog from engagement with the toothed plunger.

4. In a self-propelled vehicle of the type which includes an engine having an intake manifold, a parking brake, a toothed plunger mounted for longitudinal movement in a rectilinear path and operatively connected to the parking brake for setting said brake, and a handle carried by the toothed plunger and extending outwardly therefrom adjacent one end thereof for moving said plunger in the rectilinear path in a direction to apply the brake, means for locking said toothed plunger in brake applying position for automatic release upon the starting of the engine comprising a rock arm mounted adjacent the toothed plunger for movement in a path which intersects the rectilinear path, a latch dog carried by the rock arm for advance by said rock arm into contact with a tooth on the plunger to hold said plunger against movement in a direction to release the brake, a bolt mounted adjacent the carrier and yieldingly advanced into the path of movement of said rock arm for engaging the rock arm and holding the latch dog in engagement with the tooth on the plunger, and means carried by the bolt and operatively connected to the manifold for retracting said bolt and freeing the rock arm for movement by the toothed plunger in a direction to move the latch dog out of the rectilinear path.

5. In a self-propelled vehicle of the type which includes an engine having an intake manifold, a parking brake held in released condition under yielding effort, a toothed plunger mounted on the vehicle for rotary movement about its longitudinal axis and for longitudinal movement, said plunger being operatively connected to the parking brake for moving it against the yielding effort to apply said brake, and a handle carried by the plunger and extending outwardly therefrom for rotating the plunger and moving the plunger longitudinally against the yielding effort and applying the brake, means for locking said toothed plunger in brake applying position and for automatic release upon starting the engine, said means including a latch dog mounted adjacent the toothed plunger for movement into and out of the path of movement of the toothed plunger and into and out of engagement with a tooth on said plunger, a bolt mounted adjacent the latch dog for movement parallel to the plunger and operatively engaging and holding said latch dog in the path of movement of the toothed plunger, means carried by the bolt and operatively connected to the manifold for retracting said bolt and freeing the latch dog to move out of the path of movement of the toothed plunger to allow the plunger to move under the yielding pressure and release the brake, a latch mounted adjacent the toothed plunger at an angle to said latch dog and urged toward said plunger for operative engagement with a tooth on said plunger to releasably lock the plunger in brake applying position as the plunger is rotated about its longitudinal axis to move its teeth out of the path of movement of said latch dog and into intersecting relation with said latch member.

6. In a self-propelled vehicle of the type which includes an engine having an intake manifold, a parking brake held in released condition under yielding effort, a toothed plunger mounted on the vehicle for rotary movement about its longitudinal axis and for longitudinal movement, said plunger being operatively connected to the parking brake for moving it against the yielding effort to apply said brake, and a handle carried by the plunger and extending outwardly therefrom for rotating the plunger and moving the plunger longitudinally against the yielding effort and applying the brake, means for locking said toothed plunger in brake applying position and for automatic release upon starting the engine, said means including a latch dog mounted adjacent the toothed plunger for movement into and out of the path of movement of the toothed plunger and into and out of engagement with a tooth on said plunger, a bolt mounted adjacent the latch dog for movement parallel to the plunger and operatively engaging and holding the latch dog in the path of movement of the toothed plunger, means carried by the bolt and operatively connected to the manifold for retracting said bolt and freeing the latch dog to move out of the path of movement of the toothed plunger to allow the plunger to move under the yielding pressure and release the brake, a latch mounted adjacent the toothed plunger at an angle to said latch dog and urged toward said plunger for operative engagement with a tooth on said plunger to releasably lock the plunger in brake applying position as the plunger is rotated about its longitudinal axis to move its tooth out of the path of movement of said latch dog and into intersecting relation with said latch member, and means carried by the plunger and engageable with the guide to be operative upon release of said plunger from its engagement with said latch member to rotate the plunger about its longitudinal axis and place the teeth thereon in the path of movement of said latch dog.

References Cited in the file of this patent

UNITED STATES PATENTS

| | | |
|---|---|---|
| 2,130,892 | Morphet | Sept. 20, 1938 |
| 2,335,533 | Reavis | Nov. 30, 1943 |
| 2,532,357 | Callender | Dec. 5, 1950 |